United States Patent [19]

Perez et al.

[11] Patent Number: 5,291,751
[45] Date of Patent: Mar. 8, 1994

[54] CRYO-MECHANICAL VAPOR RECOVERY APPARATUS

[75] Inventors: Louis Perez, Brentwood, Calif.; Glenn T. Sameshima, Chicago; Robert J. Spencer, Naperville, both of Ill.

[73] Assignee: Liquid Carbonic Corporation, Oak Brook, Ill.

[21] Appl. No.: 871,934

[22] Filed: Apr. 21, 1992

[51] Int. Cl.$^5$ .......................... F25J 3/00; F26B 21/06
[52] U.S. Cl. .......................................... 62/332; 62/11; 34/73; 34/77
[58] Field of Search ................ 62/11, 181, 332; 34/27, 34/32, 73, 77, 79

[56] References Cited

U.S. PATENT DOCUMENTS

| | | | |
|---|---|---|---|
| 3,116,122 | 12/1963 | Oetjen et al. | 34/15 |
| 3,210,861 | 10/1965 | Eolkin | 34/5 |
| 3,904,102 | 9/1975 | Chu et al. | 34/27 X |
| 4,012,847 | 3/1977 | Rand | 34/75 |
| 4,053,990 | 10/1977 | Bielinski | 34/23 |
| 4,150,494 | 4/1979 | Rothchild | 34/28 |
| 4,188,793 | 2/1980 | Watson et al. | 62/51 |
| 4,223,450 | 9/1980 | Rothchild | 34/16 |
| 4,237,708 | 12/1980 | Rothchild | 62/514 R |
| 4,424,680 | 1/1984 | Rothchild | 62/48 |
| 4,444,016 | 4/1984 | Banerjee | 62/11 X |
| 4,475,293 | 10/1984 | Banerjee | 34/27 |
| 4,545,134 | 10/1985 | Mukerjee et al. | 34/77 X |
| 4,551,981 | 11/1985 | Banerjee | 62/70 |
| 4,604,115 | 8/1986 | Bonneton et al. | 62/11 |
| 4,666,480 | 5/1987 | Mann | 62/11 |
| 4,769,054 | 9/1988 | Steigman | 62/12 |
| 4,841,645 | 6/1989 | Bettcher et al. | 34/27 X |
| 4,949,473 | 8/1990 | Steinkamp | 62/332 X |
| 4,970,867 | 11/1990 | Herron et al. | 62/11 |
| 4,982,512 | 1/1991 | McClenny | 34/79 X |
| 5,083,440 | 1/1992 | Karthaus et al. | 34/73 X |
| 5,108,475 | 4/1992 | Briggs | 62/11 |
| 5,142,873 | 9/1992 | Ramsey, Jr. | 62/11 |
| 5,150,576 | 9/1992 | Minzenberger | 34/73 X |
| 5,156,173 | 10/1992 | Keyser et al. | 34/77 X |

FOREIGN PATENT DOCUMENTS

| | | |
|---|---|---|
| 2719126 | 11/1978 | Fed. Rep. of Germany . |
| 2925742 | 1/1981 | Fed. Rep. of Germany . |
| 838222 | 6/1960 | United Kingdom . |
| 2098874 | 8/1984 | United Kingdom . |

OTHER PUBLICATIONS

Two-page paper by Liquid Carbonic entitled, "Liquid Carbonic Environmental Vapor Recovery System" bearing a copyright notice dated 1989.

Primary Examiner—Henry A. Bennet
Assistant Examiner—C. Kilner
Attorney, Agent, or Firm—Fitch, Even, Tabin & Flannery

[57] ABSTRACT

Hybrid cryo-mechanical apparatus is provided to collect condensable vapors from an incoming gas flow. The gas flow is refrigerated in a series of upstream mechanical refrigeration stages, and fed to an indirect contact heat exchanger suitable for operation with a cryogen refrigerant. Temperature of the cryogen leaving the heat exchanger is monitored, and is used to operate a control valve which throttles the heat exchanger output.

22 Claims, 2 Drawing Sheets

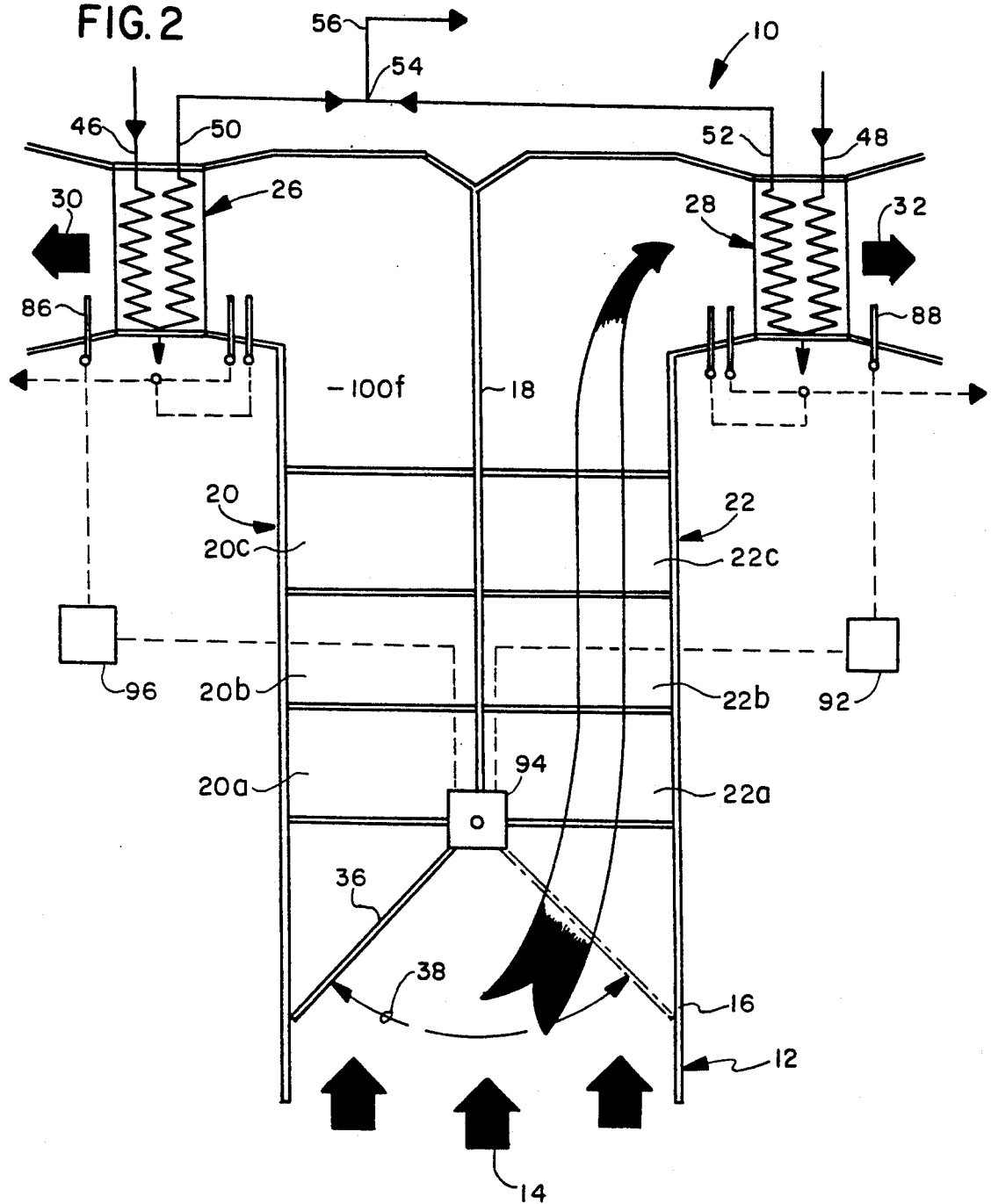

CRYO-MECHANICAL VAPOR RECOVERY APPARATUS

BACKGROUND OF THE INVENTION

1. Field of the Invention

The present invention pertains to vapor recovery, and in particular, to the collection of condensable vapor from a solvent or a carrier gas.

2. Description of the Related Art

It is desirable to recapture vapors of volatile materials to reduce or eliminate their emission to the atmosphere, and in some circumstances, to recover the volatile materials for future use. Mechanical refrigeration systems are used to condense solvents from gaseous feed streams. For example, vapor recovery systems available from Edwards Engineering corporation of Pompton Plains, N.J. use multiple mechanical refrigeration stages to condense volatile materials in gaseous feed streams.

It is sometimes necessary to achieve low operating temperatures in order to improve vapor collection efficiencies as mandated by recent regulations. In order to achieve sufficiently low operating temperatures, multiple stages of mechanical refrigeration equipment must be employed, with the final stage associated with the lowest operating temperatures to which the gaseous feed stream, already refrigerated by preceding stages, is exposed. In one particular vapor recovery system, four mechanical stages are employed, and difficulties have been encountered in maintaining commercially attractive levels of operational reliability, particularly in the final refrigeration stage.

Techniques other than mechanical refrigeration have been used to recover condensable vapors from a gas stream. For example, U.S. Pat. No. 4,424,680 and British Patent 2,098,874 use direct contact techniques for removing condensable vapor content of a gas stream. U.S. Pat. No. 4,424,680 uses an inert gas such as nitrogen, while British Patent 2,098,874 uses either liquid argon gas or liquefied nitrogen gas. British Patent 838,222 directly contacts a gas stream with cooling water to remove vapor present in the gas stream.

Improvements in vapor recovery systems are constantly being sought. It has been observed that many mechanical refrigeration systems in use today, or proposed for use today, cannot meet recent stricter emission regulations due to inherent limitations of the refrigerants used. Accordingly, efficient, practical ways for recovering condensable vapors at lower temperatures are still being sought.

Also, a backup vapor recovery system has been sought for use during emergency conditions when mechanical failure of a mechanical refrigeration stage in an emission control system threatens shutdown or curtailment of an operating plant.

SUMMARY OF THE INVENTION

Cryogenically-cooled vapor recovery stages present one possible solution, since cryogen operation can continue if one or more of the mechanical refrigeration stages located upstream have suffered mechanical failure. It is generally preferred that the cryogenically-cooled vapor recovery stages be designed for optimal vapor recovery efficiencies, based upon the successful operation of upstream mechanical refrigeration stages. However, it may be preferable to operate a cryogenically-cooled vapor recovery stage at less than optimal efficiency, rather than shut down or curtail operation of a manufacturing plant, and the cryogenically-cooled vapor recovery system according to principles of the present invention provides such emergency operation.

It is an object according to the present invention to provide a vapor recovery system having relatively high collection efficiencies and which is suitable for use in practical environments where a variety of vapor compositions and carrier gases are encountered.

Another object according to the present invention is to provide hybrid cryo-mechanical apparatus for collecting a condensable vapor from a flow of gas mixture including vapor and the carrier gas.

Another object according to the present invention is to provide an indirect contact cryogen-cooled vapor recovery apparatus having an improved control of operation.

These and other objects according to the present invention, which will become apparent from studying the appended description and drawings, are provided in a hybrid cryo-mechanical apparatus for collecting a condensable vapor from an incoming flow of a gas mixture including the vapor and a carrier gas, comprising:

a thermally insulated vessel for confining the gas mixture flow;

a flow input means for inputting the incoming flow into the vessel;

a plurality of mechanically refrigerated cooling stages within the vessel arranged in series in the direction of the gas mixture flow, and cooperating to produce a refrigerated intermediate flow; and a cryogen refrigeration stage downstream of the mechanically refrigerated cooling stages, comprising indirect contact heat exchanger means having a first input for receiving the intermediate flow, a cryogen input means for inputting a cryogen refrigerant and barrier means for preventing physical contact between the intermediate flow and the cryogen refrigerant while permitting heat flow therebetween so as to condense vapor from the intermediate flow, condensation output means for outputting condensed vapor extracted from the intermediate flow, and a flow output means for outputting from the cryogenically-cooled refrigeration stage, a modified gas flow from which the condensed vapor has been extracted.

In the preferred embodiment, two process flow paths are operated opposite of one another; that is, one flow path is taken out of operation and allowed to defrost while the other flow path is handling all or major portions of the gas mixture flow. At times, both flow paths are allowed to operate simultaneously.

BRIEF DESCRIPTION OF THE DRAWINGS

FIG. 2 is a fragmentary portion of the schematic diagram of FIG. 1, shown on an enlarged scale.

DETAILED DESCRIPTION OF THE PREFERRED EMBODIMENT

Figure 1:
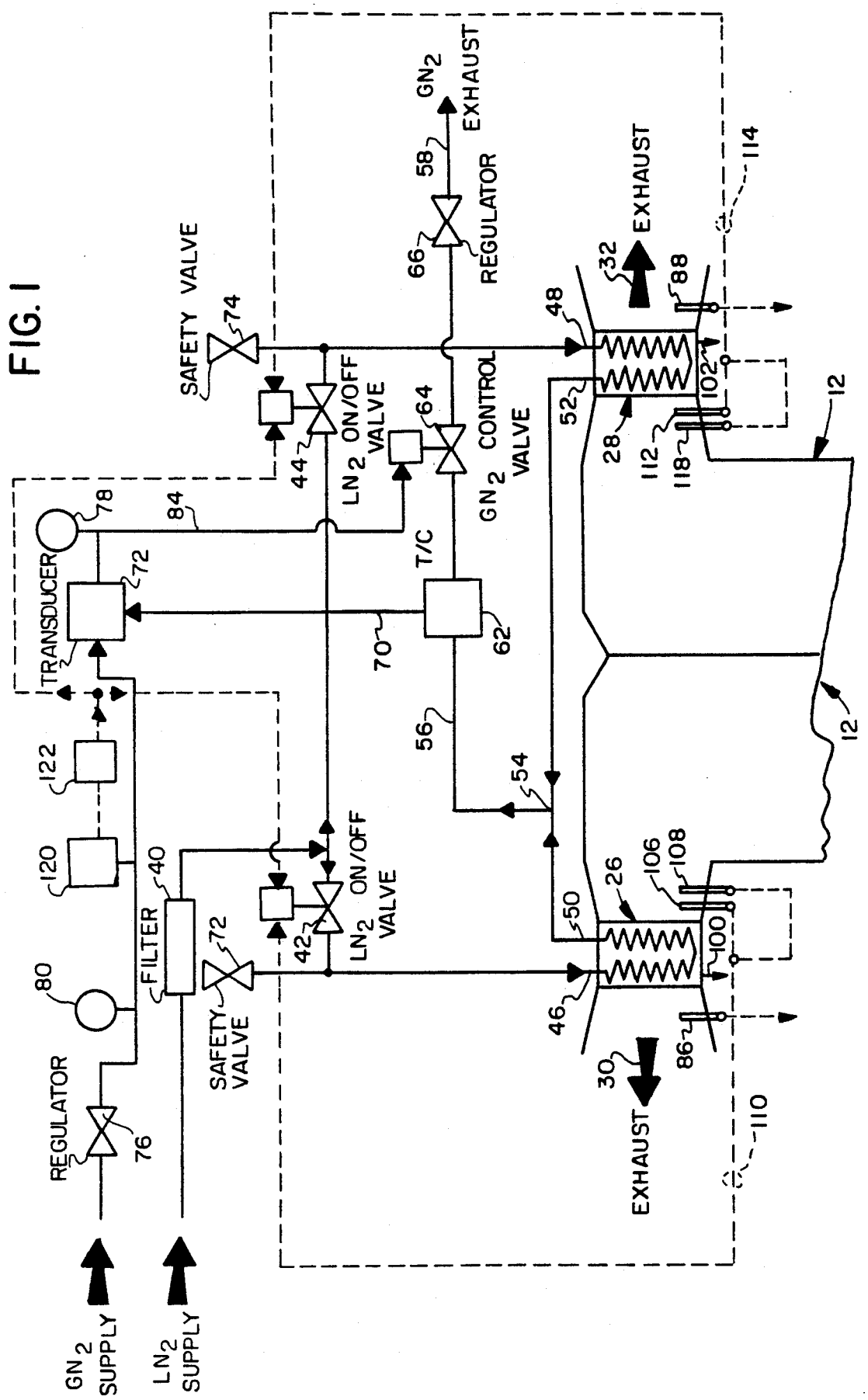
FIG. 1 is a schematic diagram of apparatus illustrating principles according to the present invention.

Referring now to the drawings, hybrid cryomechanical vapor recovery apparatus according to principles of the present invention is generally indicated at 10. The apparatus includes thermally insulated duct work generally indicated at 12, which confines an incoming gas mixture flowing in the direction of arrows 14 (see FIG. 2). The incoming flow enters a portion 16 of the duct work, which channels the flow along two preferably identical flow paths for opposed as well as simultaneous operation, as will be discussed herein. The flow paths are isolated from one another by a divider wall 18.

Each flow path includes a mechanical refrigeration system generally indicated at 20, 22, and each system includes a plurality of (preferably three) mechanical refrigeration stages 20a–20c and 22a–22c. In the preferred embodiment, the mechanical refrigeration stages are preferably of conventional construction and preferably employ R-503 refrigerant, although R-14 could be used in one or more of the mechanical refrigeration stages. The numerical designation "R-14" refers to carbon tetrafluoride, and "R-503" refers to an azeotrope of R-23 (trifluoromethane) and R-13 (chlorotrifluoromethane). Other conventional refrigerants may also be used, and the refrigerants of the various mechanical refrigeration stages need not be the same.

Evaporator coils carrying the mechanically compressed refrigerant are disposed in series in each flow path, and consequently, the gas flows exiting the final stages 20c, 22c are refrigerated to a relatively low temperature, that is, a temperature considerably below ambient. In the preferred embodiment, the gas flow is taken from a process stream in a commercial environment and the gas mixture is either at room temperature or at an elevated temperature (e.g., 75° F.) associated with evaporative drying. In the preferred embodiment, the temperature of the gas mixture exiting the mechanical refrigeration system ranges between approximately $-85°$ F. and $-100°$ F., depending upon the type of refrigerant (R-14 or R-503), the gas mixture air flow rate and the number of mechanical refrigeration stages used.

The refrigerated gas mixture then enters cryogenically-cooled recovery stages 26, 28. The cryogenically-cooled vapor recovery stages are preferably of the indirect contact type, and include a fluid cryogen refrigerant material flowing through a heat exchanger, preferably of the coil type, which provides a physical barrier between the cryogen material and the refrigerated gas mixture while allowing a thermal flow therebetween. In the cryogenically-cooled vapor recovery stages, a final, heretofore unobtainable portion of the vapor carried in the gas mixture is removed. A discharge flow exits the cryogenically-cooled vapor recovery stages, flowing through duct work in the direction of arrows 30, 32.

It is important that the cryogenically-cooled vapor recovery stages cooperate with the upstream mechanical refrigeration stages, so as to provide an integrated thermodynamic system of commercially significant low cryogen consumption and high vapor recovery rates. It is also important that the cryogenically-cooled vapor recovery stages continue efficient operation, free of chemical depositions that may reduce thermal transfer across the indirect contact heat exchangers. In one embodiment of a hybrid vapor recovery system constructed according to principles of the present invention, the final cryogenically-cooled vapor recovery stage provided a heretofore unattained, overall vapor recovery rate in excess of 99%. Vapor condensed on the heat exchanger components of vapor recovery stages 26, 28 is outputted on lines 100–102, respectively.

As mentioned above, controls are provided to attain commercially significant efficiencies of operation. For example, consumption of cryogen material is carefully monitored and it is possible to take control measures if the gas mixture enputted to the cryogenically-cooled vapor recovery stages is not sufficiently refrigerated or if the flow thereof is significantly reduced. As shown at the bottom of FIG. 2, a flow diverter gate 36 may be moved in the direction of double-headed arrow 38, between two extreme operating positions in which incoming gas mixture is diverted along one of the two flow paths provided by duct work 12. In addition, the flow diverter gate 36 may be moved to an intermediate position allowing gas mixture to flow simultaneously along both flow paths with flow being divided between the two flow paths at virtually any ratio desired.

In one mode of operation in which ambient air is processed, the cryogenically-cooled vapor recovery stages are allowed to "freeze up," blocking or reducing the flow of gas mixture therethrough. The incoming gas mixture flow of one cryogenically-cooled vapor recovery stage is partially or fully diverted to the other cryogenically-cooled vapor recovery stage, with the heat exchanger of the one vapor recovery stage being allowed to defrost. In this manner, the gas mixture flow can be toggled back and forth between the two cryogenically-cooled vapor recovery stages, or simultaneous flow stream through both cryogenically-cooled vapor recovery stages can be maintained until one of the stages shows reduced flow.

If desired, a single mechanical refrigeration system can be utilized for both cryogenically-cooled vapor recovery stages. A diverter gate can be located between the mechanical refrigeration and cryogenically-cooled stages. However, in the preferred embodiment, multiple mechanical refrigeration stages are duplicated for each flow path. As a further alternative, the separate mechanical refrigeration stages can be operated in a redundant fashion, with the output of one flow path being diverted to one cryogenically-cooled vapor recovery stage or the other, or perhaps to both cryogenically-cooled vapor recovery stages, simultaneously.

In addition to the longer cycle control of the cryogenically-cooled vapor recovery stages (associated with coil freeze-up or over-temperature), shorter cycle, dynamic control is provided, which relates to dynamic flow conditions through a cryogenically-cooled vapor recovery stage. According to one aspect of the present invention, the flow of cryogen through the heat exchangers of the cryogenically-cooled vapor recovery stages is controlled at the exhaust or outlet of the heat exchangers, rather than their input.

Referring especially to FIG. 1, a cryogen supply preferably in the form of liquid nitrogen is fed at a pressure of 100 psig through an input line including a filter 40 to the heat exchangers of each cryogenically-cooled vapor recovery stage 26, 28. Cryogen flow into the heat exchangers is controlled by valves 42, 44 associated with each respective cryogenically-cooled vapor recovery stage 26, 28. Cryogen is inputted to the cryogen vapor recovery stages 26, 28 at inlet lines 46, 48 and is exhausted from the heat exchangers at outlet lines 50, 52, respectively.

The cryogen output flow is preferably combined at a T-junction 54 and carried by a combined flow conduit 56 to a cryogen exhaust line 58. The cryogen exhausted from the vapor recovery stages passes a thermocouple 62, through a control valve 64 and a regulator 66. The combined cryogen flow in conduit 56 is monitored by the thermocouple 62 which produces an output signal on line 70 to transducer 72. The transducer 72 sends a control signal to control valve 64, changing the flow of cryogen outputted from the cryogenically-cooled vapor recovery stages 26, 28.

The preferred operation of control valve 64 uses a fluid medium, preferably a gaseous nitrogen supply fed through a regulator 76 to transducer 72. Pressure at the output of transducer 72 is monitored at a pressure gage 78, and pressure of the gaseous supply downstream of regulator 76 is monitored by pressure gage 80. According to one aspect of the present invention, the thermocouple 62 is coupled to control valve 64 to provide the input or driving signal for valve operation. The thermocouple 62 may comprise any one of a number of different commercially available types suited for use with a particular control valve 64. In the preferred embodiment, the thermocouple 62 includes a Powers Process Controls Model No. 512-A27 process controller, which is adapted to drive transducer 72 which preferably comprises Honeywell Transducer Model No. 87022. The transducer outputs a gaseous nitrogen supply drive signal on line 84 coupled to control valve 64.

As mentioned above, a flow diverter gate 36 may be employed, if desired, to provide opposed operation of the gas flow paths. The gate 36 is preferably operated in response to signals from flow control sensors 86, 88 located at the output or downstream side of cryogenically-cooled vapor recovery stages 26, 28, respectively. The flow sensors 86, 88 are coupled through optional process controllers 90, 92. The flow control signals are then inputted to the gate process controller 94, which responds to the flow control signals and adjusts the position of gate 36 in an appropriate fashion.

For example, with reference to FIG. 2, gate 36 is moved to the position shown, diverting gas mixture flow away from cryogenically-cooled vapor recovery system 26 in response to an indication of reduced gas mixture flow through that stage. In the position indicated, gas mixture flow is diverted through mechanical refrigeration stages 22a–22c and through cryogenically-cooled vapor recovery stage 28, to produce an output flow in the direction of arrow 32, which is monitored by flow sensor 88. As the flow detected by sensor 88 diminishes, gate 36 is moved to divert gas mixture flow toward mechanical refrigeration stages 20a–20c and cryogenically-cooled vapor recovery stage 26.

Output of the mechanical refrigeration stages is monitored at the input to each cryogenically-cooled vapor recovery stage, preferably by both temperature sensors and flow sensors. For example, temperature switch 106 has a predefined temperature trip point, and produces an output signal on line 110 which is coupled to valve 42, to control cryogen inputted to the heat exchanger. Preferably, the temperature switch 106 provides bi-stable operation, causing valve 42 to respond to either an open or a closed position. Temperature switch 106 is set to detect an abnormally high temperature at the input to the cryogenically-cooled vapor recovery stage 26, corresponding to an operating condition in which cryogen consumption is excessive. Such operating conditions may be associated with the failure or reduced operation of one or more of the preceding mechanical refrigeration stages, located upstream of the cryogenically-cooled vapor recovery stage 26.

A similar over-temperature sensor arrangement is provided for cryogenically-cooled vapor recovery stage 28. A temperature switch 112 is coupled through line 114 to control valve 44, turning off cryogen flow into the heat exchanger associated with cryogenically-cooled vapor recovery stage 28 when over-temperature condition is sensed. In the preferred embodiment, monitoring of the flow inputted to the cryogenically-cooled vapor recovery stages is also preferred. Flow sensors 108, 118 are located at the inlet to cryogenically-cooled vapor recovery stages 26, 28, respectively, and are set to valve off the respective cryogen inputs ween flow levels of refrigerated gas mixture fall below specified minimum levels. The minimum flow level setting is preferably associated with a full or partial "freeze-up" condition of the mechanical refrigeration stages located upstream of the cryogenically-cooled vapor recovery stages. Thus, in their preferred operation, the flow sensors 108, 118 prevent needless consumption of cryogen material, and may, in some conditions, prevent freezing of a cryogenically-cooled vapor recovery stage heat exchanger. If desired, the temperature sensors 106, 112, or flow sensors 108, 118 may be omitted and are not required for vapor recovery operation of the cryogenically-cooled stages 26, 28.

The temperature switches 106, 112 and flow control switches 108, 118, as mentioned, provide signals inputted to valves 42, 44 controlling input of liquid cryogen to heat exchangers of the cryogenically-cooled vapor recovery systems. In the preferred embodiment, the valves 42, 44 utilize fluid pressure for actuation, which is preferably provided by the gaseous nitrogen supply fed through regulator 76. The gas supply for valves 42, 44 is transmitted through pressure switch 120 and relay 122, so that the valves 42, 44 will not be left open if the gaseous nitrogen supply should become interrupted.

Thus, it can be seen that cryogen flow through the heat exchangers of cryogenically-cooled vapor recovery stages 26, 28 is modulated by controlling the exhaust at the output side of the heat exchangers. For example, if the thermocouple 62 senses a higher temperature than desired, control valve 64 can be opened slightly to allow a greater flow of cryogen through the associated heat exchanger of either stage 26 or 28. In a preferred operating mode, the input to one or the other cryogenically-cooled vapor recovery stage may be turned off for significant periods of time, and thus opening of control valve 64 will have no effect. In this manner, control valve 64 can affect operation of a selected cryogenically-cooled vapor recovery stage, or if needed, can control operation of both stages at once.

It has been found that control of the cryogen flow by a single valve located downstream of the heat exchangers of the cryogenically-cooled vapor recovery stages is the most stable and efficient method for indirect contact cooling processes. Further, it has been found advantageous to drive the single control valve with a signal proportional to the temperature of the exhausted cryogen gas stream, output from the cryogenically-cooled vapor recovery stages. With the control system of the preferred embodiment described above, it is possible that the control valve 64 may cause liquid cryogen to become trapped within the piping leading to the heat exchanger inputs, and accordingly, safety valves 72, 74 are provided.

In one embodiment of the present invention, the incoming gas mixture comprises air borne vapor driven off of a product by evaporative heating, producing a gas mixture slightly above ambient temperature (about 75° F.). The vapor was comprised of a 80/20 (W/W) solution of methylene chloride/methanol. With the addition of the cryogenically-cooled vapor recovery stage, the solvent recovery rate was improved from 93%–96% (the best rates practically achievable with mechanical systems above, on a regular basis) to values exceeding 99%. Further, these collection efficiencies were attained at commercially significant flow rates, exceeding 1,000 ACFM at the inlet to the cryogenically-cooled vapor recovery stages.

As mentioned above, the cryogenically-cooled vapor recovery stage is operated in an open-loop mode, although it is possible to collect the exhausted cryogen vapor and reliquefy the vapor using either cryogen of the same or a different type, or mechanical refrigeration techniques to provide closed-loop operation for the cryogenically-cooled vapor recovery stages.

The regulator 66 located downstream of the control valve 64 may be required for certain gas mixtures, such as those described above, where an ignition hazard may be present. Regulator 66 (set at 50 psig) was provided in the preferred embodiment, to maintain a minimum pressure within the heat exchanger of the cryogenically-cooled vapor recovery stage sufficient to insure that formation of oxygen enriched liquid air would be avoided.

Accordingly, it can be seen that the present invention provides a final cryogenically-cooled vapor recovery stage which collects vapor from a refrigerated gas stream. The cryogen can comprise liquid nitrogen or other materials. The gas stream may be refrigerated by either mechanical refrigeration or cryogenically-cooled refrigeration techniques. The present invention also provides a combined hybrid cryomechanical vapor recovery system. Although the vapor recovery arrangements described above can be used with a variety of solvents and gas carriers, an arrangement for recovering a specific solvent, namely, mixture of methylene chloride and methanol (preferably in a weight ratio of 80/20 (W/W)), has been provided by the present invention.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Hybrid cryo-mechanical apparatus for collecting a condensable vapor from an incoming flow of a gas mixture including the vapor and a carrier gas, comprising:
   a thermally insulated vessel for confining the gas mixture flow, the thermally insulated vessel defining a plurality of flow paths, separate from one another;
   a flow input means for inputting the incoming flow into the vessel;
   a plurality of mechanically refrigerated cooling stages within the vessel arranged in series in the direction of the gas mixture flow, and cooperating to produce a refrigerated intermediate flow;
   a cryogen-cooled refrigeration stage downstream of the mechanically refrigerated cooling stages, comprising indirect contact heat exchanger means having a first input for receiving the intermediate flow, a cryogen input means for inputting a cryogen refrigerant and barrier means for preventing physical contact between the intermediate flow and the cryogen refrigerant while permitting heat flow therebetween so as to condense vapor from the intermediate flow, condensation output means for outputting condensed vapor extracted from the intermediate flow, and a flow output means for outputting from the cryogen-cooled refrigeration stage, a modified gas flow from which the condensed vapor has been extracted; and
   directing means for directing the flow along the flow paths through said plurality of mechanically refrigerated cooling stages and said cryogen-cooled refrigeration stage.

2. The apparatus of claim 1 wherein each flow path includes a plurality of mechanically refrigerated cooling stages and a cryogenically-cooled refrigeration stage.

3. The apparatus of claim 2 wherein said directing means comprises a diverter gate for diverting incoming flow to one or more flow paths.

4. The apparatus of claim 3 further comprising flow sensing means for sensing gas mixture flow through the cryogenically-cooled refrigeration stage of at least a first flow path and for producing a gate operating signal in response thereto, and means responsive to said gate operating signal for moving said diverter gate so as to divert incoming flow away from the first flow path toward another flow path.

5. The apparatus of claim 2 wherein each said flow path includes at least three mechanically refrigerated cooling stages which use R-503 refrigerant.

6. The apparatus of claim 2 further comprising temperature sensing means for sensing the temperature of gas mixture flow into the cryogenically-cooled refrigeration stage of at least a first flow path and for producing a cryogen control signal in response to sensing a preselected temperature, cryogen input control means responsive to said cryogen control signal for reducing the flow of cryogenically-cooled refrigerant into the cryogen refrigeration stage.

7. The apparatus of claim 2 further comprising flow sensing means for sensing the amount of gas mixture flow into the cryogenically-cooled refrigeration stage of at least a first flow path and for producing a cryogen control signal in response to sensing a preselected flow level, and cryogen input control means responsive to said cryogen control signal for reducing the flow of cryogen refrigerant into the cryogenically-cooled refrigeration stage.

8. The apparatus of claim 1 further comprising combining means for combining the cryogen refrigerant outputted from plural cryogenically-cooled refrigeration stages into a combined cryogen flow, cryogen control means for controlling cryogen flow through the cryogenically-cooled refrigeration stages in response to a temperature signal and temperature sensing means coupled to the cryogen control means for sensing the temperature of the combined cryogen flow, and for producing a temperature signal to which the cryogen control means responds.

9. The apparatus of claim 8 wherein said cryogen control means comprises valve means for valving the flow of cryogen refrigerant outputted from said cryogenically-cooled refrigeration stages.

10. Apparatus for collecting a condensable vapor from an incoming flow of a gas mixture including the vapor and a carrier gas, the incoming flow refrigerated below ambient temperature, comprising:

a thermally insulated vessel for confining the incoming flow along first and second separate flow paths;

gas mixture input means for inputting the incoming flow of gas mixture into the vessel;

first and second cryogenically-cooled refrigeration stages downstream of the flow directing means, one for each flow path, each stage comprising indirect contact heat exchanger means having a gas mixture input for receiving gas mixture flowing along one of the first and second flow paths, a cryogen input means for receiving a cryogen refrigerant flow and barrier means for preventing physical contact between the gas mixture and the cryogen refrigerant while permitting heat flow therebetween so as to condense vapor from the flow portions, condensation output means for collecting condensed vapor extracted from the flow portions, modified flow output means for outputting a modified gas flow from which the condensed vapor has been extracted and a cryogen output means for outputting the cryogen refrigerant;

cryogen combining means for combining the cryogen refrigerants outputted from the first and second cryogenically-cooled refrigeration stages to form a combined cryogen output flow;

means for sensing the temperature of the combined cryogen output flow and for generating a temperature signal in response thereto;

cryogen control valve means for controlling the combined cryogen output flow in response to the temperature signal; and means for coupling said temperature signal to said flow control valve means;

whereby, in response to the temperature signal, flow of cryogen refrigerant into the indirect contact heat exchanger is controlled.

11. The apparatus of claim 10 wherein said cryogen control valve means are located downstream of said cryogen combining means.

12. The apparatus of claim 10 wherein the flow directing means further comprises a plurality of mechanically refrigerated cooling stages within the vessel arranged in series in the direction of the gas mixture flow, to refrigerate the gas mixture flow therethrough below ambient temperature.

13. The apparatus of claim 10 wherein each cryogenically-cooled refrigeration stage further comprises flow sensors for sensing the flow of gas mixture entering the cryogen refrigeration stage and for generating a low flow signal in response to sensing a gas mixture flow level below a preselected minimum flow level;

cryogen valve means upstream of the cryogen input means of each cryogenically-cooled refrigeration stage for controlling cryogen refrigerant flow into the cryogenically-cooled refrigeration stage in response to a low flow signal;

means for coupling the flow sensors to said cryogen valve means.

14. The apparatus of claim 10 wherein each cryogenically-cooled refrigeration stage further comprises gas mixture temperature sensors for sensing the temperature of gas mixture flow entering each path, and for generating a control signal in response to sensing a preselected temperature;

cryogen valve means upstream of the cryogen input means of each cryogenically-cooled refrigeration stage for controlling cryogen refrigerant flow into the cryogenically-cooled refrigeration stage in response to the control signal;

means for coupling the temperature sensors to said cryogen valve means.

15. The apparatus of claim 10 wherein the gas mixture input means comprises a diverter gate for diverting incoming flow to one or both of the first and second flow paths.

16. The apparatus of claim 15 wherein the cryogenically-cooled refrigeration stage of the first flow path further comprises flow sensing means for sensing flow through the cryogenically-cooled refrigeration stage of at least the first flow path and for producing a gate operating signal in response thereto, and means coupled to the flow sensing means and responsive to said gate operating signal for moving said diverter gate so as to divert incoming flow away from the first flow path toward the second flow path.

17. Apparatus for collecting a vapor including methylene chloride vapor and methanol vapor from an incoming flow of gas mixture including the vapor and a carrier gas, comprising:

a thermally insulated vessel for confining the gas mixture flow;

a first input means for inputting the incoming flow into the vessel;

a plurality of mechanically refrigerated cooling stages within the vessel for refrigerating said incoming flow to a temperature no higher than a preselected minimum temperature, said mechanically refrigerated cooling stages arranged in series in the direction of the incoming flow and cooperating to produce a refrigerated output flow of refrigerated gas mixture; and a cryogenically-cooled refrigeration stage downstream of the mechanically refrigerated cooling stages, comprising indirect contact heat exchanger means having a first input for receiving the refrigerated output flow, a cryogen input means for inputting a cryogen refrigerant and barrier means for preventing physical contact between the refrigerated output flow and the cryogen refrigerant while permitting heat flow therebetween so as to condense the vapor from the refrigerated output flow, condensation output means for outputting condensed vapor extracted from the refrigerated output flow, modified flow output means for outputting a modified gas flow portion from which the condensed vapor has been extracted and a cryogen output means for outputting a cryogen output flow from the cryogenically-cooled refrigeration stage.

18. The apparatus of claim 17 wherein said cryogenically-cooled refrigeration stage further comprises cryogen control means downstream of the cryogen output means, for controlling cryogen refrigerant flow through the cryogenically-cooled refrigeration stage in response to a temperature signal and temperature sensing means coupled to the cryogen control means for sensing the temperature of the cryogen output flow, and for producing a temperature signal to which the cryogen control means responds.

19. The apparatus of claim 18 wherein the carrier gas comprises ambient air and the apparatus further comprises pressure regulator means downstream of the cryogen output means.

20. Hybrid cryo-mechanical apparatus for collecting a condensable vapor from an incoming flow of a gas mixture including the vapor and a carrier gas, comprising:

- a thermally insulated vessel for confining the gas mixture flow;
- a flow input means for inputting the incoming flow into the vessel;
- a plurality of mechanically refrigerated cooling stages within the vessel arranged in series in the direction of the gas mixture flow, and cooperating to produce a refrigerated intermediate flow;
- a cryogen-cooled refrigeration stage downstream of the mechanically refrigerated cooling stages, comprising indirect contact heat exchanger means having a first input for receiving the intermediate flow, a cryogen input means for inputting a cryogen refrigerant and barrier means for preventing physical contact between the intermediate flow and the cryogen refrigerant while permitting heat flow therebetween so as to condense vapor from the intermediate flow, condensation output means for outputting condensed vapor extracted from the intermediate flow, and a flow output means for outputting from the cryogen-cooled refrigeration stage, a modified gas flow from which the condensed vapor has been extracted; and
- said cryogen-cooled refrigeration stage further comprises cryogen output means for exhausting a cryogen output flow from the cryogen-cooled refrigeration stage, cryogen control means donwstream of the cryogen output means, for controlling cryogen refrigerant flow through the cryogen-cooled refrigeration stage in response to a temperature signal and temperature sensing means coupled to the cryogen control means for sensing the temperature of the cryogen output flow, and for producing a temperature signal to which the cryogen control means responds.

21. Hybrid cryo-mechanical apparatus for collecting a condensable vapor from an incoming flow of a gas mixture including the vapor and a carrier gas, comprising:

- a thermally insulated vessel for confining the gas mixture flow;
- a flow input means for inputting the incoming flow into the vessel;
- a plurality of mechanically refrigerated cooling stages within the vessel arranged in series in the direction of the gas mixture flow, and cooperating to produce a refrigerated intermediate flow; and
- a cryogen-cooled refrigeration stage downstream of the mechanically refrigerated cooling stages, comprising indirect contact heat exchanger means having a first input for receiving the intermediate flow, a cryogen input means for inputting a cryogen refrigerant and barrier means for preventing physical contact between the intermediate flow and the cryogen refrigerant while permitting heat flow therebetween so as to condense vapor from the intermediate flow, condensation output means for outputting condensed vapor extracted from the intermediate flow, and a flow output means for outputting from the cryogen-cooled refrigeration stage, a modified gas flow from which the condensed vapor has been extracted; and
- temperature sensing means for sensing the temperature of gas mixture flow into the cryogen-cooled refrigeration stage of at least a first flow path and for producing a cryogen control signal in response to sensing a preselected temperature, cryogen input control means responsive to said cryogen control signal for reducing the flow of cryogen refrigerant into the cryogen-cooled refrigeration stage.

22. Hybrid cryo-mechanical apparatus for collecting a condensable vapor from an incoming flow of a gas mixture including the vapor and a carrier gas, comprising:

- a thermally insulated vessel for confining the gas mixture flow;
- a flow input means for inputting the incoming flow into the vessel;
- a plurality of mechanically refrigerated cooling stages within the vessel arranged in series in the direction of the gas mixture flow, and cooperating to produce a refrigerated intermediate flow;
- a cryogen-cooled refrigeration stage donwstream of the mechanically refrigerated cooling stages, comprising indirect contact heat exchanger means having a first input for receiving the intermediate flow, a cryogen input means for inputting a cryogen refrigerant and barrier means for preventing physical contact between the intermediate flow and the cryogen refrigerant while permitting heat flow therebetween so as to condense vapor from the intermediate flow, condensation output means for outputting condensed vapor extracted from the intermediate flow, and a flow output means for outputting from the cryogen-cooled refrigeration stage, a modified gas flow from which the condensed vapor has been extracted; and
- flow sensing means for sensing the amount of gas mixture flow into the cryogen-cooled refrigeration stage of at least a first flow path and for producing a cryogen control signal in response to sensing a preselected flow level, and cryogen input control means responsive to said cryogen control signal for reducing the flow of cryogen refrigerant into the cryogen-cooled refrigeration stage.

* * * * *